United States Patent
Weber et al.

(10) Patent No.: US 7,693,935 B2
(45) Date of Patent: Apr. 6, 2010

(54) METHOD FOR PROVIDING A USER INTERFACE FOR CONTROLLING AN APPLIANCE IN A NETWORK OF DISTRIBUTED STATIONS, AS WELL AS A NETWORK APPLIANCE FOR CARRYING OUT THE METHOD

(75) Inventors: Michael Weber, Hannover (DE); Ingo Hütter, Pattensen (DE)

(73) Assignee: Thomson Licensing, Boulogne Billancourt (FR)

( * ) Notice: Subject to any disclaimer, the term of this patent is extended or adjusted under 35 U.S.C. 154(b) by 1094 days.

(21) Appl. No.: 10/835,025

(22) Filed: Apr. 29, 2004

(65) Prior Publication Data
US 2004/0227779 A1 Nov. 18, 2004

(30) Foreign Application Priority Data
May 2, 2003 (DE) .................................. 103 19 935

(51) Int. Cl.
G06F 15/16 (2006.01)
G09G 5/00 (2006.01)

(52) U.S. Cl. ........................ 709/203; 709/218; 709/249; 709/250; 715/201; 715/205; 715/700; 715/714; 715/717; 715/737

(58) Field of Classification Search ................ 709/203, 709/218, 249, 250; 715/201, 205, 700, 714, 715/717, 737
See application file for complete search history.

(56) References Cited

U.S. PATENT DOCUMENTS 5,583,560 A 12/1996 Florin et al.
5,793,366 A 8/1998 Mano et al.

(Continued)

FOREIGN PATENT DOCUMENTS

EP 0853402 7/1998

(Continued)

*Primary Examiner*—Alina N. Boutah
(74) *Attorney, Agent, or Firm*—Robert D. Shedd; Joseph J. Opalach; Reitseng Lin

(57) ABSTRACT

The invention relates to the field of domestic network technology. The control of an appliance in the network via a central appliance for the network and having a display unit is normally simplified with the aid of user interfaces. When an audio-video datastream has to be transmitted between two network appliances, then this takes place via data links that are set up. There is then a close relationship between the connected appliances, and this requires frequent switching between the user interfaces of the two appliances. For example, when the user interface for a CD player is displayed, this user interface must first of all be closed and a user interface for an amplifier in the network must be started, usually by selection from the list of all the appliances in the network, in order then to set the volume for the amplifier. The aim of the invention is to simplify the control of such appliances which are coupled to one another via a data link that has been set up. This is achieved by providing a field in the user interface for an appliance to be controlled, in which field a list of those appliances which maintain a connection that has been set up is displayed, and the user interface of that appliance is displayed with it. This results in a preselection from the list of all of the appliances in the network, allowing the desired user interface to be selected more quickly.

11 Claims, 4 Drawing Sheets

U.S. PATENT DOCUMENTS

| | | | |
|---|---|---|---|
| 5,883,621 | A | 3/1999 | Iwamura |
| 6,032,202 | A * | 2/2000 | Lea et al. .................. 710/8 |
| 6,462,753 | B1 | 10/2002 | Koyata et al. |
| 6,563,430 | B1 * | 5/2003 | Kemink et al. ......... 340/825.49 |
| 6,690,392 | B1 * | 2/2004 | Wugoski .................. 715/744 |
| 6,694,363 | B1 * | 2/2004 | Yamadaji et al. ........... 709/223 |
| 6,868,292 | B2 * | 3/2005 | Ficco et al. ................ 700/19 |
| 6,870,555 | B2 * | 3/2005 | Sekiguchi ................. 715/740 |
| 6,892,230 | B1 * | 5/2005 | Gu et al. ................... 709/220 |
| 6,912,613 | B2 | 6/2005 | Lee et al. |
| 6,930,730 | B2 * | 8/2005 | Maxon et al. ............... 348/734 |
| 6,963,784 | B1 * | 11/2005 | Gibbs ..................... 700/94 |
| 6,978,473 | B1 * | 12/2005 | Nsonwu et al. .............. 725/52 |
| 7,039,858 | B2 * | 5/2006 | Humpleman et al. ........ 715/205 |
| 7,043,532 | B1 * | 5/2006 | Humpleman et al. ........ 709/208 |
| 7,130,616 | B2 * | 10/2006 | Janik ..................... 455/412.1 |
| 7,200,683 | B1 * | 4/2007 | Wang et al. ............... 709/250 |
| 7,260,597 | B1 * | 8/2007 | Hofrichter et al. .......... 709/200 |
| 2001/0042043 | A1 * | 11/2001 | Shear et al. ................ 705/51 |
| 2002/0040408 | A1 * | 4/2002 | Choi ...................... 709/245 |
| 2002/0073244 | A1 * | 6/2002 | Davies et al. ............... 709/328 |
| 2002/0174270 | A1 * | 11/2002 | Stecyk et al. ............... 710/1 |
| 2003/0009537 | A1 * | 1/2003 | Wang ..................... 709/219 |
| 2003/0014766 | A1 * | 1/2003 | Dinwiddie et al. .......... 725/126 |
| 2003/0018753 | A1 * | 1/2003 | Seki ...................... 709/219 |
| 2003/0030660 | A1 * | 2/2003 | Dischert et al. ............. 345/718 |
| 2003/0035074 | A1 * | 2/2003 | Dubil et al. ............... 348/734 |
| 2003/0038849 | A1 * | 2/2003 | Craven et al. .............. 345/864 |
| 2003/0044020 | A1 * | 3/2003 | Aboba et al. ............... 380/278 |
| 2003/0065824 | A1 * | 4/2003 | Kudo ..................... 709/250 |
| 2003/0073461 | A1 * | 4/2003 | Sinclair ................... 455/557 |
| 2003/0074421 | A1 * | 4/2003 | Kusano et al. .............. 709/219 |
| 2003/0081745 | A1 * | 5/2003 | Ito et al. ................. 379/102.03 |
| 2003/0090515 | A1 * | 5/2003 | Chang et al. ............... 345/745 |
| 2003/0210126 | A1 * | 11/2003 | Kanazawa ................. 340/5.5 |
| 2003/0228005 | A1 * | 12/2003 | Melick et al. ............ 379/93.01 |
| 2004/0003073 | A1 * | 1/2004 | Krzyzanowski et al. ..... 709/223 |
| 2004/0025179 | A1 * | 2/2004 | Russ et al. ................. 725/46 |
| 2004/0044725 | A1 * | 3/2004 | Bell et al. ................. 709/203 |
| 2004/0203387 | A1 * | 10/2004 | Grannan ................... 455/41.2 |
| 2004/0250273 | A1 * | 12/2004 | Swix et al. ................ 725/25 |
| 2005/0086300 | A1 * | 4/2005 | Yeager et al. .............. 709/204 |

FOREIGN PATENT DOCUMENTS

| | | |
|---|---|---|
| EP | 1014701 | 6/2000 |
| WO | 02/35770 A2 | 5/2002 |

\* cited by examiner

DTV

| UI |

| DCM (AV-DISPLAY) |

| EMGR | REG | DCMMGR | RMGR | SMGR |

| MSYS |

| CMM |

- - - - - - - - - - - - - - - - - - - - - - -

| IEEE 1394 |

Fig.2

METHOD FOR PROVIDING A USER INTERFACE FOR CONTROLLING AN APPLIANCE IN A NETWORK OF DISTRIBUTED STATIONS, AS WELL AS A NETWORK APPLIANCE FOR CARRYING OUT THE METHOD

FIELD OF THE INVENTION

The invention relates to the field of domestic networks, and relates in particular to the field of controlling appliances in a network, as well as to a corresponding network appliance.

BACKGROUND OF THE INVENTION

A domestic network is used to connect a wide range of appliances to one another. Appliances such as these may stem from the field of entertainment electronics, for example a television, video recorder, DVD player, satellite receiver, CD player, MD player, amplifier, radio, camcorder, etc.

Recently, thought has been given not only to the networking of appliances from entertainment electronics, but also appliances from other fields, for example conventional domestic appliances such as a washing machine, dishwasher, refrigerator, microwave oven, coffee machine, electric cooker, dryer, as well as domestic appliances such as heating control, a burglar alarm, or office communication appliances such as a telephone system, personal computer, fax machine etc. can in principle be integrated in a domestic network.

Industry has developed appropriate communications systems for the networking of appliances in the field of entertainment electronics. This relates primarily to the networking of appliances with the aid of the so-called IEEE 1394 bus system, which allows data to be interchanged at a very high data rate between the individual network stations. The IEEE 1394 interfaces, which are now in widespread use, generally support the specified data transmission rates of S100, S200 and S400. In this case, S100 means a data transmission rate of 100 Mbit/s. In a corresponding manner, S200 means 200 Mbit/s and S400 thus means 400 Mbit/s. High data rates such as these occur in particular with entertainment electronics appliances. This is due to the fact that the typical application for data interchange between entertainment electronics appliances is for playing back a title in the case of a video or audio source, either of video film or a piece of music, and transmitting the associated datastream to a further entertainment electronics appliance, which acts as a sink. Typical video sources are, for example, a set top box, a satellite receiver, a video recorder, a DVD player, a modem, a camcorder, a digital camera or else a personal computer. Typical audio sources are, for example, a CD player, a tuner/radio, a DVD player, a cassette player (DAT/DCC), an MD player, an MP3 player, a personal computer, etc.

Sinks for a video datastream may, in particular, be: a computer monitor, a television, etc. The appliances with a video display unit are pure sinks for video data. The following items may, however, also be regarded as sinks for video data: all recording appliances such as video recorders, which use various recording media. For example, this includes classical video recorders based on VHS or S-VHS Standard, digital video recorders based on the D-VHS Standard, digital video recorders based on DVD, in particular DVD-R, DVD+RW, DVD-RW and DVD-RAM technology and hard disk recorders which are being increasingly used in digital set top boxes.

Sinks for audio data include, for example, an amplifier or digital loudspeakers, which effectively act as active boxes and each contain their own amplifier. As in the case of sinks for video data, combination appliances also exist, however, which act as source and sinks for audio data, such as CD recorders, audio tape recorders, cassette players (DAT/DCC), MP3 players, MD players, personal computers, video recorders, DVD recorders, etc.

However, only the lower layers of the ISO/OSI reference model for data communication are specified in the IEEE Standard 1394. These are the physical layer, the data link layer and parts of the network layer as well as the transport layer. The higher layers of the ISO/OSI reference model are not specified in this Standard.

A consortium of companies has taken over the task of specifying the higher layers. The corresponding system proposal/standard has become known by the expression HAVi (Home Audio Video interoperability). The HAVi Standard has primarily been worked out for communication between entertainment electronics appliances in the domestic network field. It is thus possible to operate/to control the appliances in the network from a central appliance which is specially equipped for this purpose. The central appliance is generally equipped with a video display unit. This may therefore be, in particular, a television or a personal computer. The HAVi technology allows the network structure to be displayed on a display, allows one of the network appliances to be selected, allows a user interface to be produced for the selected appliance, and then allows this appliance to be operated/controlled.

SUMMARY OF THE INVENTION

As described in the introduction, the appliances connected in a domestic network are controlled via user interfaces. For the typical application of data transmission from a video/audio source to a video/audio sink, a data link must be set up between the two appliances. To do this, the source appliance is first of all selected from a list of the appliances, the user interface for the source appliance must be started, the data link to the sink appliance must be set up, and the playback process must then be started. If settings then have to be made for the sink appliance, such as for example a change to the brightness in the case of an appliance with a video display unit, the user interface for the source appliance must be ended, the sink appliance must be selected from the list of appliances, the user interface for the sink appliance must be started, and the new settings must be made on the sink appliance. If a setting relating to the source appliance is then to be changed once again, for example reselection of a different title, then the control process is similar. First of all, the user interface for the sink appliance must be ended, the source appliance must be selected from the list, the user interface for the source appliance must be started, and the control process must be carried out. The source and sink of a data link are frequently closely related to one another, so that it is more frequently necessary to change backwards and forwards between the user interfaces of the two appliances. Although appliances can be controlled relatively easily via user interfaces, the inventors have found, however, that the frequent opening and closing of user interfaces, in particular as well as the selection from a relatively long list of appliances, leads to increased control complexity, however, and they have therefore made it their object to simplify the control of such appliances which are coupled via a connection that has been set up.

According to the invention, this is achieved by inserting into the user interfaces of the appliances a field in which a list is displayed containing information as to which appliances in the network maintain a data link with the selected appliance. This effectively results in a preselection being made, and the displayed list is very much smaller than the list of all the network appliances. Navigation in this list is clearer, and is simplified. There is no longer any need to navigate a cursor or a mouse cursor through a long appliance list in order to reach the desired appliance in the end.

The solution according to the invention is claimed in the independent claims 1 and 5. Further improvements are possible by the measures described in the dependent claims. When a connected appliance is selected from the list of connected appliances, the current user interface is closed, and the user interface for the selected appliance is produced, automatically. There is no need to separately close the current user interface.

It is also advantageous for the user interface for an appliance to be set up such that an area is provided for the listing of the control elements of the appliance to be controlled, and is designed such that the listed control elements correspond to corresponding keys on a remote control.

It is likewise advantageous for a control element to be provided in the user interface of an appliance, which initiates the selection of the list of connected appliances and carries out hierarchical adaptation in the area for the listing of the control elements, so that the only control elements which are then visible are those which are relevant for navigation and selection in the list of connected appliances. This improves the clarity and makes control easier.

BRIEF DESCRIPTION OF THE DRAWINGS

The invention will be explained in more detail in the following text with reference to drawings, in which:

FIG. 2 shows the software elements of an HAVi-FAV appliance;

DETAILED DESCRIPTION OF THE INVENTION

Figure 1:
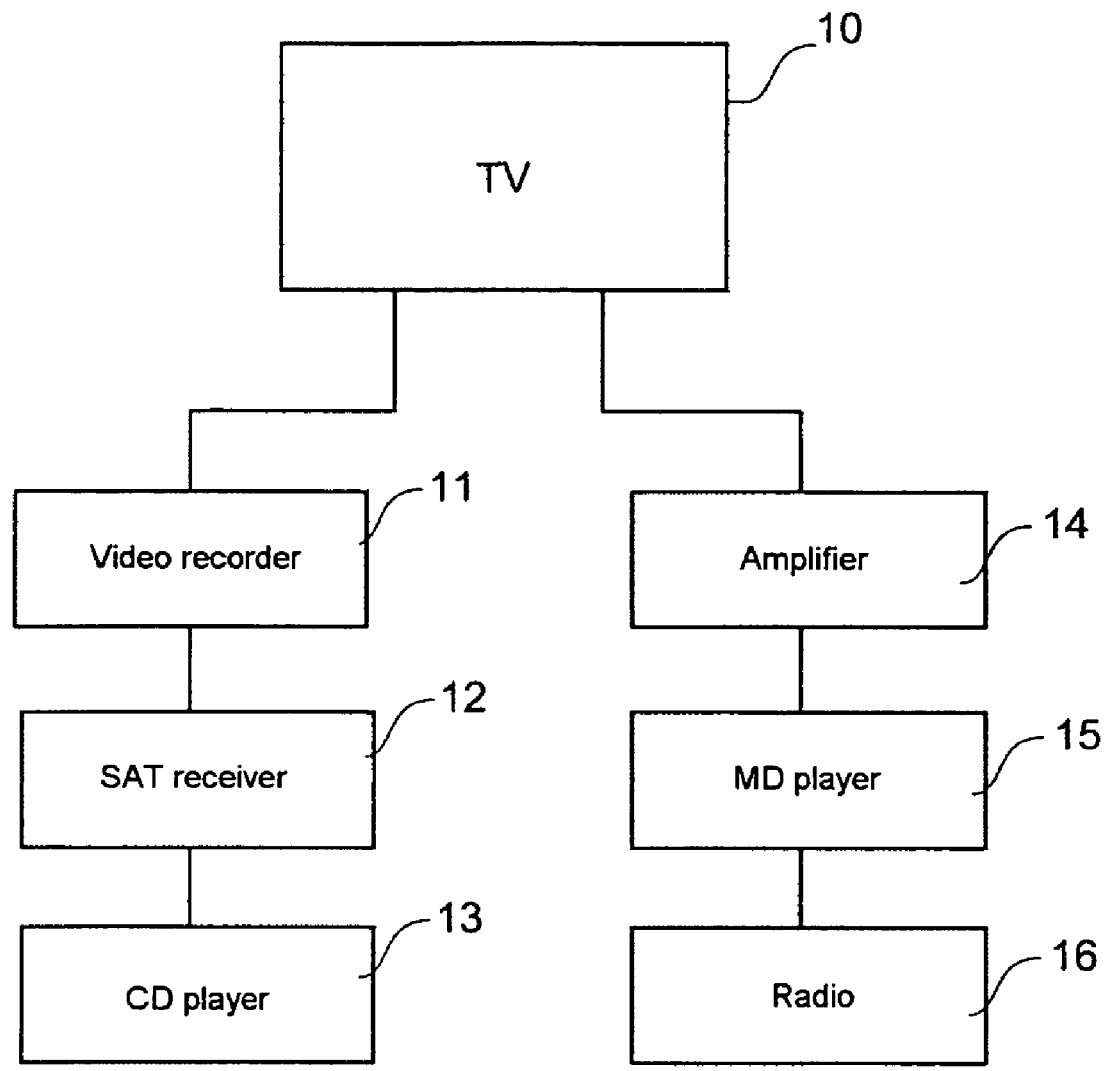
FIG. 1 shows the structure of an example of a domestic network.

FIG. 1 illustrates an example of a structure of a domestic network. The reference number 10 denotes a television. The reference number 11 denotes a video recorder, the reference number 12 a satellite receiver, the reference number 13 a CD player (compact disk), the reference number 14 an amplifier, the reference number 15 an MD player (minidisk) and the reference number 16 a radio receiver. In the illustrated example, only the television 10 has a real video display unit. The appliances in the domestic network are therefore preferably controlled via user interfaces from the television. All the appliances are networked with one another via an IEEE 1394 bus. The corresponding technology is known to those skilled in the art from the IEEE Standard 1394.

The example also provides for the network appliances to be set up such that they are HAVi-compliant. Version 1.1 of the HAVi specification is now available, and is likewise known to those skilled in the art. The precise title is: Specification of the Home Audio/Video interoperability (HAVi) Architecture, Version 1.1, May 15, 2001.

The HAVi Standard distinguishes between various classes of appliances. These are so-called Full AV Devices (FAV appliances), Intermediate AV Devices (IAV appliances), Base AV Devices (BAV appliances) and Legacy AV Devices (LAV appliances). Of these appliance classes, only the appliances in the last class, the LAV appliances, are already existing entertainment electronics appliances, which are not designed in any way to be compliant with the HAVi Standard. No such appliances occur in the example of a network shown in FIG. 1. All the other appliance types are already designed to comply with the HAVi Standard.

In this case, FAV appliances have the greatest functional scope and the greatest support of the HAVi Standard. The particular feature of FAV appliances is that they provide a runtime environment for JAVA byte code. This allows an FAV appliance to load JAVA byte code from other appliances, and thus to create an extended capability for controlling it. The television 10 in the domestic network shown in FIG. 1 is an HAVi-FAV appliance.

The class of IAV appliances is characterized by a restricted functional scope and limited resource capabilities. They do not offer a runtime environment for JAVA byte code and can therefore not be used as a controller for any one of the other appliances in the domestic network. However, they can support predefined functions of specific appliances and can therefore also control appliances in the domestic network to a restricted extent. In the domestic network illustrated in FIG. 1, the video recorder 11 and the satellite receiver 12 are in the form of IAV appliances.

The BAV appliances offer even less functional scope and do not have a complete HAVi stack. They cannot themselves control other appliances in the domestic network, but are controlled by FAV and IAV appliances. In the example in FIG. 1, the other appliances comprising the CD player 13, the amplifier 14, the MD player 15 and the radio 16 are in the form of BAV appliances.

FIG. 2 shows the software elements of an HAVi-FAV appliance. These are an event manager EMGR, a registry REG, a DCM manager, DCMMGR, a resource manager RMGR, a stream manager SMGR, a messaging system MSYS and a communication media manager CMM. A further IEEE 1394 component is also shown underneath the software component CMM in FIG. 2. However, this should not necessarily be regarded as being an HAVi software component. This is only intended to indicate that each appliance also in fact has an interface for the IEEE 1394 bus protocol. However, nowadays, the IEEE 1394 bus protocol is normally implemented in hardware with the aid of a 1394 physical layer IC and a 1394 data link layer IC. This component is therefore shown separately from the other software components, by means of a dashed line.

The software components which are listed in FIG. 2 are all known from the HAVi Standard and will therefore not be explained in any more detail in the following text.

The television 10 also has a further software component—the so-called user interface UI. This corresponds to an application program which controls the screen layers in accordance with commands entered by the user and also passes on the associated messages via the messaging system MSYS to other appliances or to the DCM or to an FCM for that particular appliance. An appliance comprises a DCM and one or more FCMs. In this case, DCM stands for device control module, and forms an interface for controlling general appliance functions. FCMs (functional component modules) form an interface for controlling specific appliance components.

Specific FCM functionalities are already predefined in the HAVi Standard. These are a tuner FCM, a VCR FCM, a clock FCM, a camera FCM, an AV disk FCM, an amplifier FCM, a display FCM, an AV display FCM, a modem FCM and a WEB proxy FCM.

An AV display FCM is accordingly implemented in the television 10. A VCR FCM is implemented in the video recorder 11. A tuner FCM is implemented in the satellite receiver 12. An AV disk FCM is incorporated in the CD player 13, an amplifier FCM is integrated in the amplifier 14, an AV disk FCM is likewise implemented in the MD player 15, and a tuner FCM is in turn implemented in the radio 16.

Figure 3:
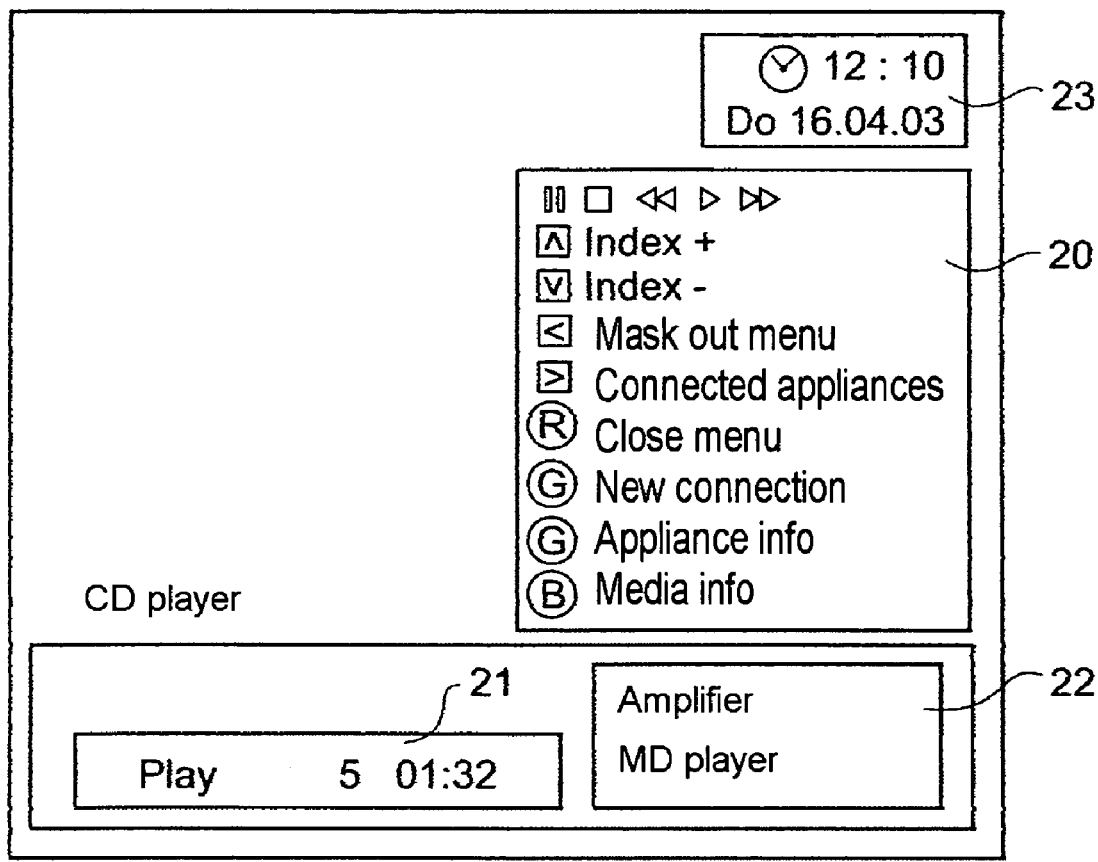
FIG. 3 shows a user interface for controlling a CD player (main menu)

FIG. 3 now shows the configuration of the user interface (main menu) for controlling the CD player 13. The main menu is laid out such that the major control elements for a CD player are listed symbolically in an area which is annotated by the reference number 20. These therefore relate in particular to replay, stop, pause, backward search, forward search. However, a number of additional control elements are likewise also listed. The index +/− keys allow the various titles on the inserted CD to be selected. The left key of the cursor control keys allows the menu to be masked out. However, in this case, it has not yet been closed correctly and can be overlaid again by pushing any key. The right key is used to enter the list of connected appliances, and this will be explained in more detail in the following text. The red colored key can be used to completely close the displayed menu. The green colored key is used to select the menu for setting up a new data link. The yellow colored key is used to select a menu item where appliance information relating to the CD player is output. These include, for example, the model, the year of manufacture, the playback options that are available, the programming option, etc. The blue colored key which is also shown, is used to call up a menu relating to the media information, that is to say this provides the list of the titles, title length and so on recorded on the CD.

The reference number 22 denotes an area of the user interface in which a list of the connected appliances is displayed. In the example, the CD player is connected both to the amplifier 14 and to the MD player 15. The specific application concealed behind this is that the piece of music being played back from the CD player is output via the amplifier to the loudspeakers while, however, the title which is being played back is at the same time recorded in the MD player 15.

The further area 21 of the user interface is reserved for outputting status information, where the current operating mode is displayed. In the illustrated example, the operating mode is the playback mode, with the fifth title on the CD being played back, whose playing time is currently 1 minute 32 seconds.

Finally, the reference number 23 also denotes an area in which the time, the data and the day of the week are displayed.

In order to configure the list of connected appliances 22, the user interface UI for the appliance which is currently to be controlled registers with the event manager in order to receive connection events. When a connection is now set up or cleared in the network, the user interface UI of the appliance which is currently to be controlled is informed and a check is carried out to determine whether it is itself a source or a sink for the connection which has been set up or cleared. If this is the case, the appliance at the other end of the connection is entered in the list of connected appliances, or is deleted from it.

Figure 4:
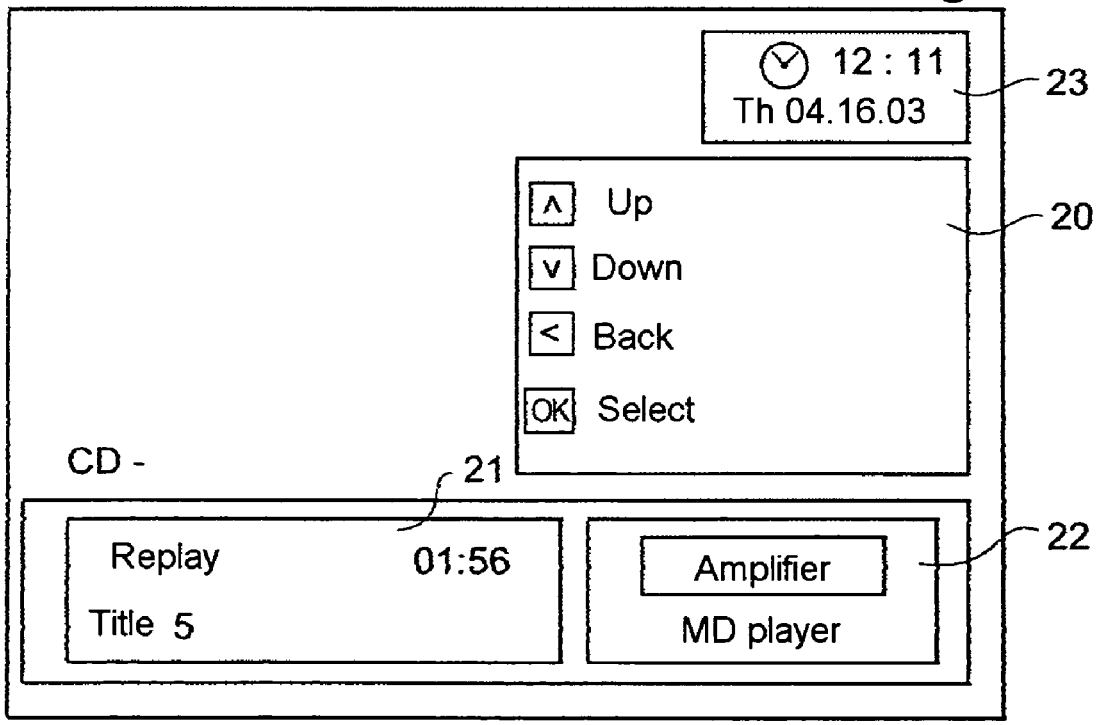
FIG. 4 shows the user interface of a CD player after selection of the list of connected appliances (sub-menu)

FIG. 4 now shows the user interface of the CD player 13 after selection of the list of the connected appliances with the aid of the right key on the remote control. As shown in FIG. 4, the position at which the cursor/mouse cursor is located is emphasized in the area to indicate the list of connected appliances 22. FIG. 4 uses a surrounding line to show that the cursor is currently positioned on the amplifier. If the user wishes to select the MD player 15 rather than the amplifier, then he must first of all push the down key on the remote control to move the cursor/mouse cursor to the next entry in the list of connected appliances. Only the navigation keys up/down as well as the selection key OK and a back key in the form of the left key are shown in the area 20 in FIG. 4, in order to indicate the control elements. This is a so-called sub-menu which is intended for navigation within the list of connected appliances. Once the user has moved the cursor/mouse cursor to the desired appliance, he will have to start the user interface for the appliance selected in this way, by pushing the selection key. After pushing the selection key, the user interface for the CD player is closed, and the user interface for the selected appliance is started instead.

Figure 5:
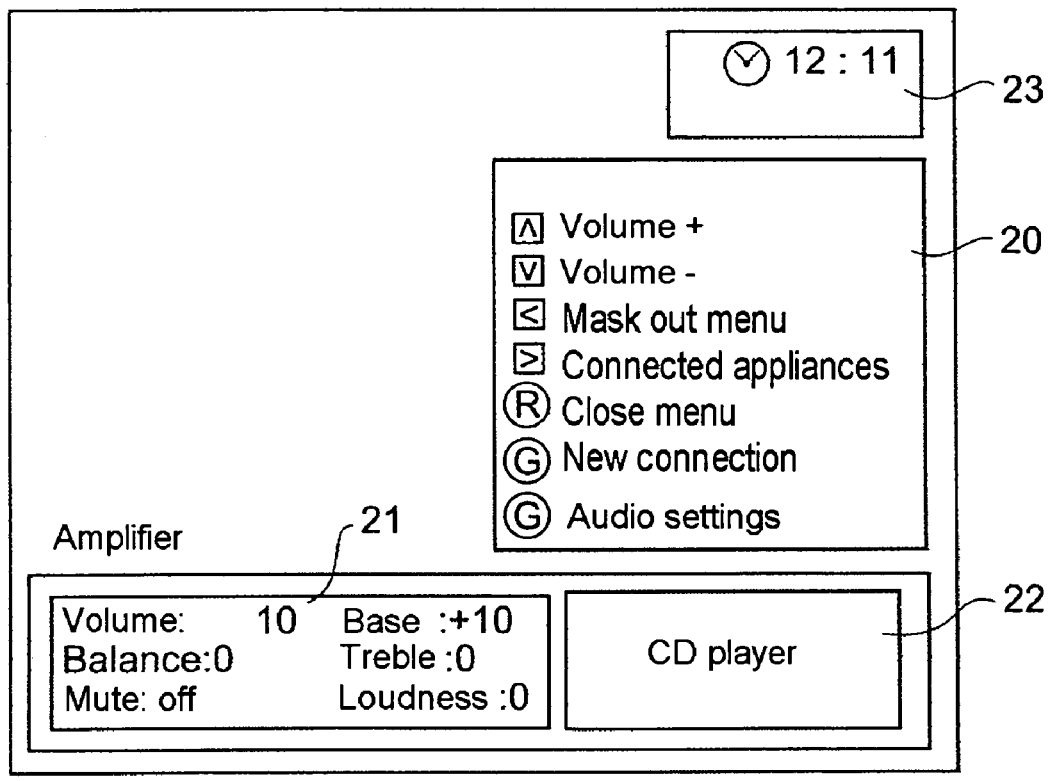
FIG. 5 shows a user interface for controlling an amplifier (main menu)

As an example, FIG. 5 shows the user interface for the amplifier, which was selected prior to this from the list of connected appliances, by pushing the selection key. This shows the main menu for controlling the amplifier. In addition to the up and down volume keys in the area 20 for the control elements for the amplifier, the mask out menu (left key), connected appliances (right key), close menu (red key), new connection (green key) and audio settings (yellow key) keys are listed. After pushing this key, a sub-menu is overlaid, in which various parameters of the amplifier can be set. These include, for example, balance, base setting, treble setting, volume, equalizer setting, etc.

As is illustrated in FIG. 5, matching is carried out in the area 22 for the list of connected appliances. This is because the amplifier 14 only has a data link to the CD player 13. In a corresponding manner, the list of connected appliances shows only the CD player 13.

Once the setting for the amplifier 14 has been updated, for example by changing the volume, it is possible to change back to the menu for the CD player 13 by using the right key to select the list of connected appliances and by selecting the user interface for the CD player by pushing the OK key.

Figure 6:
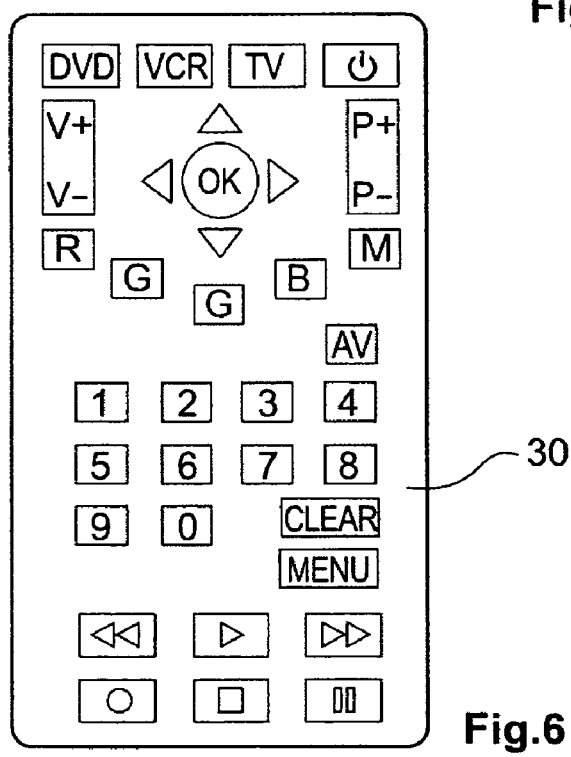
FIG. 6 shows the key arrangement for a commercially available remote control.

FIG. 6 also shows the arrangement of the keys on a commercially available remote control. In addition to the numbered keys and the colored keys, the remote control also has the left, right, up, down cursor control keys, and the selection key OK. Furthermore, the specific keys are provided for controlling a DVD or CD player, or a video recorder. These are playback, backward search, forward search, stop, pause and record. An arrangement with a toggle key is provided for volume adjustment, and likewise for program selection. Further keys relate to the selection of a CD/DVD player, a video recorder, a television, and a specific key for calling the respective main menu and ending it. The conventional AV key for switching between the video sources and the key for switching between standby and normal operation are likewise provided.

The invention is not restricted to the exemplary embodiment described here. In addition to entertainment electronics appliances, further appliances in a different category may also be included in the network. Some of these have already been mentioned in the introduction and relate to "white goods" appliances and other electronic appliances which are used for domestic purposes.

The network is also not necessarily based on interchanging data via an IEEE 1394 bus. Other possible bus standards are, for example, Ethernet, Token ring, Power Line Communication, wire-free communication, for example based on HiperLan/2, or IEEE 802.11x. The higher data interchange layers need not necessarily be configured in accordance with the HAVi system. Other communications systems may be used here, for example OSGI, UPnP, or Jini.

What is claimed is:

1. A method for providing user interfaces in a network of distributed appliances, the method comprising steps of:

providing a first user interface for an appliance to be controlled, the first user interface including a first set of control elements for the appliance to be controlled and a first list of the appliances in the network which maintain a registered data link which has been set up with the appliance to be controlled;

enabling user selection of the first list providing a second user interface for the appliance to be controlled in response to the user selection of the first list, the second user interface including the first list and a second set of control elements for the appliance to be controlled different from the first set of control elements;

enabling user selection of one of the appliances from the first list in the second user interface; and providing a third user interface with control elements for the selected appliance in response to the user selection of the appliance, the third user interface including a second list of one or more of the appliances in the network which maintain a registered data link which has been set up with the selected appliance.

2. The method as claimed in claim 1, wherein, when one of the appliances is selected from the first list in the second user interface, the second user interface is ended and the third user interface replaces the second user interface.

3. The method as claimed in claim 1, wherein the control elements in the third user interface correspond to keys on a remote control.

4. The method as claimed in claim 1, wherein the first, second and third user interfaces each include an area for displaying status information including an operating mode.

5. The method as claimed in claim 1, wherein the control elements in the third user interface further include a control element which enables navigation in the second list.

6. A network appliance connected in a network of distributed appliances, the network appliance comprising:

a control module for controlling functions of the network appliance, wherein the network appliance is capable of performing functions including:

providing a first user interface for an appliance to be controlled, the first user interface including a first set of control elements for the appliance to be controlled and a first list of the appliances in the network which maintain a registered data link which has been set up with the appliance to be controlled;

enabling user selection of the first list;

providing a second user interface for the appliance to be controlled in response to the user selection of the first list, the second user interface including the first list and a second set of control elements for the appliance to be controlled different from the first set of control elements;

enabling user selection of one of the appliances from the first list in the second user interface; and providing a third user interface with control elements for the selected appliance in response to the user selection of the appliance, the third user interface including a second list of one or more of the appliances in the network which maintain a registered data link which has been set up with the selected appliance.

7. The network appliance as claimed in claim 6, wherein, when one of the appliances is selected from the first list in the second user interface, the second user interface is ended and the third user interface replaces the second user interface.

8. The network appliance as claimed in claim 6, wherein the control elements in the third user interface correspond to keys on a remote control.

9. The network appliance as claimed in claim 6, wherein the first, second and third user interfaces each include an area for displaying status information including an operating mode.

10. The network appliance as claimed in claim 6, wherein the control elements in the third user interface further include a control element which enables navigation in the second list.

11. The network appliance as claimed in claim 6, wherein the network appliance is designed in accordance with the HAVi Standard.

* * * * *